J. W. CASH.
AUTOMOBILE REVERSE GUARD.
APPLICATION FILED JULY 23, 1917.

1,258,315.

Patented Mar. 5, 1918.

Witness:
J. Milton Jester

Inventor
John W. Cash
By D. A. Gourick
Attorney

UNITED STATES PATENT OFFICE.

JOHN W. CASH, OF GIRARD TOWNSHIP, MACOUPIN COUNTY, ILLINOIS.

AUTOMOBILE REVERSE-GUARD.

1,258,315.  Specification of Letters Patent.  Patented Mar. 5, 1918.

Application filed July 23, 1917. Serial No. 182,291.

*To all whom it may concern:*

Be it known that I, JOHN W. CASH, a citizen of the United States, residing in the township of Girard, in the county of Macoupin and State of Illinois, have invented certain new and useful Improvements in Automobile Reverse - Guards, of which the following is a specification.

This invention relates to control devices for automobiles of the sliding gear type and has for its object the provision of a guard associated with the gear shift lever whereby the lever is prevented from being accidentally thrown into the reversing position when the shift is made from low to intermediate gear.

It is well known that in automobiles of the sliding gear type in which the gear shift lever is movable in a slot of an H shape, in which the rear end of the left arm of the slot is the low speed position and the front end of the same slot the reversing position, there is great danger when shifting from the low speed position through the cross part of the slot to the intermediate and high gear positions at the right arm of the slot, of passing the cross slot and consequently throwing the gears inadvertently into the reversing position.

It is with this danger in mind that the present invention has been designed which contemplates the provision of a guard so positioned as to prevent this contingency but which is removable at will by hand or foot to prevent the lever being shifted into the reversing position when desired.

Figure 1:
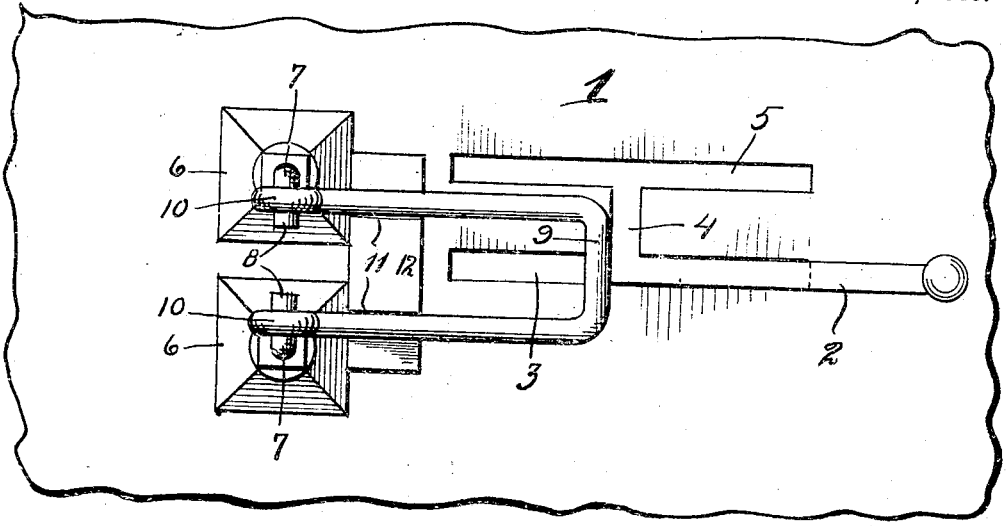
Figure 2:
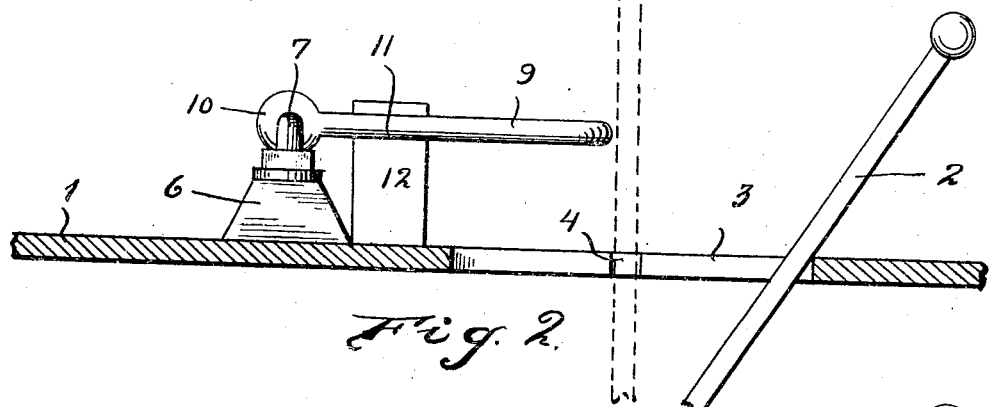
Figure 3:
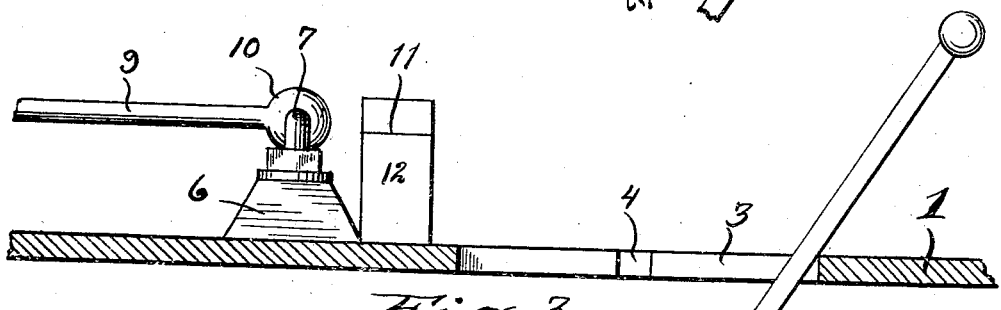

With this and various other objects, such as cheapness, simplicity, and durability of such a device in view, the invention consists in the novel construction and arrangement of parts to be hereinafter more fully described and claimed, and illustrated in the accompanying drawings, in which, Figure 1 is a plan view of the front portion of the floor of an automobile of the sliding gear type showing the invention in place thereon, Fig. 2 is a vertical sectional view therethrough showing my guard in side elevation, and Fig. 3 is a similar view, with the guard swung to its inoperative position.

Referring more particularly to the drawings, the numeral 1 designates the front portion of the floor of an automobile provided with a gear shift lever 2 movable within an H slot comprising the left arm 3, cross arm 4 and right arm 5.

In carrying out my invention I provide a pair of base blocks 6 of frusto-conical, frusto-pyramidal, or other desired shape, from which extend upwardly standards 7 secured in position in any desired manner and having their upper ends bent toward each other to form the horizontal portions 8 extending in alinement and with their ends toward each other as shown. A U shaped yoke 9 has the ends of its arms provided with eyes 10 pivotally receiving said horizontal portions 8 and is adapted when in its operative position to rest upon shoulders 11 on a stop block 12 secured upon the floor 1 adjacent the forward end of the H slot.

The operation of the device is as follows: The normal position of the lever 2 when the automobile is not traveling is in the cross slot 4, the neutral position. The normal position of my device is as shown in the first two figures of the drawings. When the lever 2 is moved to the left into the arm 3 of the slot and pulled all the way back the automobile will travel forwardly on low gear. When it is desired to shift into intermediate or high gear, the lever 2 will be pushed forwardly as far as the cross slot 4, through the cross slot and then to either the forward or rear end of the slot 5 as the case may be. With the yoke 9 of my device in the position shown in Figs. 1 and 2, the lever will engage the yoke upon reaching the cross slot 4, thus preventing the lever from being moved accidentally too far forward in the slot 3; such excessive movement forward resulting in stripping the gears. It will be observed that the yoke 9 does not extend over the arm 5 of the slot and consequently does not interfere with the movement of the lever in this slot, into the intermediate or high gear positions.

When it is desired to move the lever 2 all the way forward in the slot 3 into the reversing position, it is merely necessary to swing the yoke 9 into the position shown in Fig. 3 leaving the slot 3 unobstructed; such swinging being accomplished by hand or by a kick of the foot.

From the foregoing description and a study of the drawings it will be apparent that I have provided a simple, inexpensive and efficient device whereby movement of the gear shift lever of an automobile from the low gear position into the reverse position accidentally may be prevented; thereby preventing stripping of the gears.

It will of course be understood that the device is equally well adapted for use in connection with all gear shift levers having an H movement even though no slots exist in the floor.

It will also be understood that I reserve the right to make such changes in the form, construction and arrangement of parts as will be within the scope of the subjoined claim.

I claim:

A device for preventing accidental movement of the gear shift lever of a motor vehicle to the "reverse" position, comprising a supporting block secured forwardly of the lever when the lever is in the "neutral" position a U-shaped yoke having the ends of its arms laterally bent and revolubly engaged within said bearing members, and a second block located between said first named block and said lever and supporting said yoke in a substantially horizontal position with its bight disposed in position to be engaged by said lever whe nthe lever is in the "neutral" position, said second named block being provided with an upstanding portion disposed between the arms of the yoke, said yoke being swingable out of the path of movement of lever.

In testimony whereof I hereto affix my signature.

JOHN W. CASH.

Copies of this patent may be obtained for five cents each, by addressing the "Commissioner of Patents, Washington, D. C."

It is hereby certified that in Letters Patent No. 1,258,315, granted March 5, 1918, upon the application of John W. Cash, of Girard township, Macoupin county, Illinois, for an improvement in "Automobile Reverse-Guards," an error appears in the printed specification requiring correction as follows: Page 2, claim, strike out line 18 and insert the words *lever, bearing members carried by said block,* ; and that the said Letters Patent should be read with this correction therein that the same may conform to the record of the case in the Patent Office.

Signed and sealed this 16th day of April, A. D., 1918.

[SEAL.]

F. W. H. CLAY,

*Acting Commissioner of Patents.*

Cl. 74—39.